United States Patent [19]

Mayer

[11] 4,399,694
[45] Aug. 23, 1983

[54] GRAVITY GRADIOMETER COMPASS
[75] Inventor: Arthur Mayer, Kew Gardens, N.Y.
[73] Assignee: Sperry Corporation, New York, N.Y.
[21] Appl. No.: 213,137
[22] Filed: Dec. 4, 1980
[51] Int. Cl.³ ............................................. G01C 19/38
[52] U.S. Cl. ................................ 73/178 R; 73/382 G; 33/326
[58] Field of Search .................. 33/318, 324, 326; 73/178 R, 382 G

[56] References Cited
U.S. PATENT DOCUMENTS 3,545,266 12/1970 Wilson .............................. 73/178 R
3,722,284 5/1973 Weber et al. ......................... 73/382
3,731,537 5/1973 Trageser ............................... 73/382

OTHER PUBLICATIONS

Metzger, E. H., Recent Gravity Gradiometer Developments, AIAA Guidance and Control Specialist Conference, Hollywood, Fla.—Aug. 8–9, 1977.

Primary Examiner—James J. Gill
Attorney, Agent, or Firm—Howard P. Terry

[57] ABSTRACT

A gravity gradiometer disposed upon a gyroscopically stabilized platform in a vehicle can be modified, without impairment of its normal operation, to perform compassing functions.

6 Claims, 1 Drawing Figure

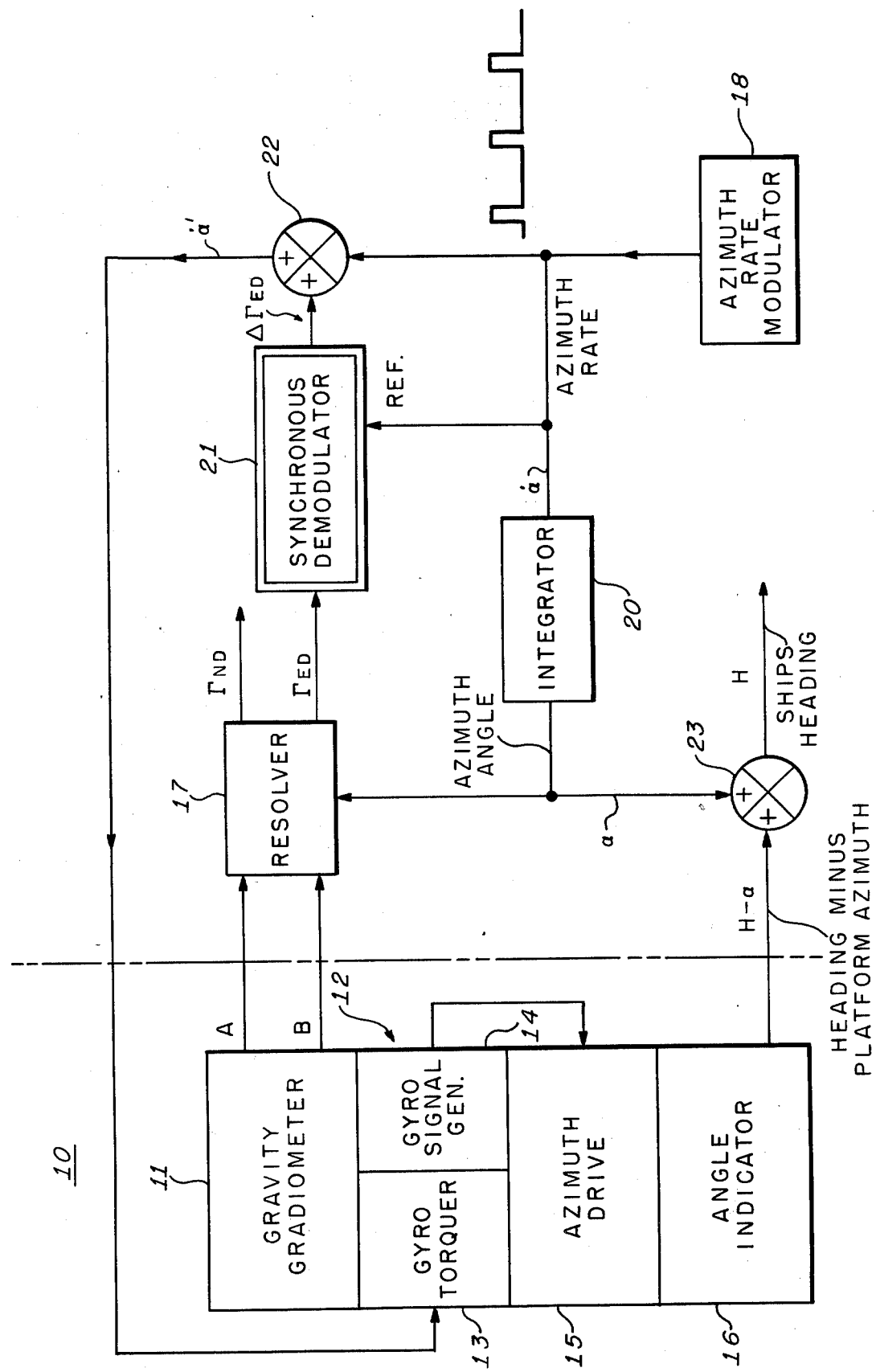

GRAVITY GRADIOMETER COMPASS

BACKGROUND OF THE INVENTION

1. Field of the Invention

This invention relates to gravity gradiometer systems and more specifically to a gravity gradiometer compass.

2. Description of the Prior Art

A gravity gradiometer system delivers six outputs, representing the six elements of the local gravity gradient tensor. With reference to a local coordinate system whose axes are directed northward, eastward and downward, the six outputs may be labelled $\Gamma_{NN}$, $\Gamma_{EE}$, $\Gamma_{DD}$, $\Gamma_{NE}$, $\Gamma_{ND}$, $\Gamma_{ED}$.

Currently in the United States, there are three approaches to developing gravity gradiometer instruments. one approach is generally described in U.S. Pat. No. 3,731,537, issued May 8, 1973 to Trageser, and a second approach is generally described in U.S. Pat. No. 3,722,284, issued May 27, 1973 to Weber et al, assigned to Hughes Aircraft Company. The third approach is described in a paper prepared by E. H. Metzger for the AIAA Guidance and Control Specialist Conference, Hollywood, Fla. Aug. 8-9, 1977, and entitled "Recent Gravity Gradiometer Developments".

Any of these gravity gradiometer instruments may be attached to a gyroscopically stabilized level platform to provide a gravity gradiometer system suitable for use on a ship or other vehicle.

Moving vehicles such as ships typically include gyrocompasses to determine the heading of the ship. The inclusion of a gyroscopically stabilized gravity gradiometer on board a ship would result in a duplication of gyroscopic components common to both the gravity gradiometer system and the gyrocompass. Accordingly, modifying the gravity gradiometer to perform the additional function of a gyrocompass would result in a significant cost saving and would provide a highly accurate gyrocompass.

SUMMARY OF THE INVENTION

The apparatus of the present invention includes a gravity gradiometer system of the type having a gravity gradiometer instrument disposed upon a gyroscopically stabilized level platform in a ship or other vehicle. The platform is rotatable in azimuth and incorporates an azimuth angle indicator. Platform azimuth rate is commanded by an azimuth rate modulator.

The system is modified by inclusion of a synchronous demodulator that detects the response to azimuth rate modulation of the $\Gamma_{ED}$ output of the gravity gradiometer. The demodulator output is nulled by a control loop that adjusts platform azimuth, and the azimuth angle indicator then provides an accurate reading of vehicular heading.

BRIEF DESCRIPTION OF THE DRAWINGS

The sole FIGURE illustrates a block diagram of the apparatus of the present invention.

DESCRIPTION OF THE PREFERRED EMBODIMENT

Referring now to the sole FIGURE, a functional block diagram of a gravity gradiometer system and the apparatus of the present invention is provided. A gravity gradiometer system includes a gravity gradiometer instrument 11 disposed upon a platform 10 mounted in gimbals on a vehicle. The platform 10 is functionally depicted as including an azimuth gyro 12 with a gyro torquer 13 and a gyro signal generator 14, an azimuth drive 15, and an angle indicator 16. The platform 10 is gyro-stabilized in azimuth, and the direction of the platform azimuth axis is also stabilized, by means not shown, to coincide with the local vertical. Rotation of platform 10 relative to the vehicle is read out by the angle indicator 16, which may be a synchro or a shaft encoder, and whose output represents the difference between platform azimuth and the vehicle's heading.

To the right of the dashed line in the block diagram are signal-processing parts which need not be mounted on the stable platform. These parts include a resolver 17 which computes the outputs $\Gamma_{ND}$ and $\Gamma_{ED}$, an azimuth rate modulator 18 or pulse generator which provides a pulsed output $\dot{\alpha}$, an integrator 20 whose gain is matched to the azimuth gyro 12 and which computes an azimuth angle $\alpha$, and a synchronous demodulator 21 which takes its reference from the azimuth rate modulator 18 and which develops a demodulated signal proportional to the modulated part of $\Gamma_{ED}$. The synchronous demodulator 21, being a new part required to make the gravity gradiometer system perform as a ship's compass, is shown in the block diagram with double outline.

In one of the modes of operation of the gravity gradiometer system, the gravity gradiometer instrument 11 is subjected to a pulsed rotation about the vertical. This is accomplished by slewing the stable platform 10 through an azimuth angle of 45° or 60° or 120°, the slewing speed being roughly 15° per second. The stable platform remains fixed in azimuth for about one minute, after which time it is slewed again, and so on.

Rotation about the vertical produces an apparent gravity gradient in the platform 10, to which the gravity gradiometer 11 responds. The predominant response is proportional to the square of azimuth rate, and it appears in the outputs $\Gamma_{NN}$ and $\Gamma_{EE}$; but there is also a significant term, proportional to the product of earth rate and azimuth rate, that appear elsewhere. Specifically, if $\Omega$ denotes the rate of rotation of the earth about its polar axis, L denotes local latitude and $\dot{\alpha}$ denotes azimuth slew rate, then the increment to $\Gamma_{ND}$ during slew will be $$\Delta\Gamma_{ND} = \dot{\alpha}\Omega \cos L.$$

In contrast with $\Gamma_{ND}$, the output $\Gamma_{ED}$ should be uninfluenced by platform azimuth rate. This supposes that the N, E, D reference axes are truly north, east and down; otherwise, $\Gamma_{ED}$ will be influenced by azimuth rate. Supposing that the D-axis is truly verical, let $\epsilon$ be the angular deviation of the supposed N-axis from true north. Then the response of $\Gamma_{ED}$ to azimuth rate is $$\Delta\Gamma_{ED} = \epsilon\dot{\alpha}\Omega \cos L.$$

The functional block diagram depicts how platform azimuth is adjusted to nullify the response of $\Gamma_{ED}$ to azimuth rate, thereby assuring that $\epsilon$ is zero and that the supposed N-axis is actually pointing true north.

The gravity gradiometer 11 delivers two signals, A and B, to the resolver 17, which produces $\Gamma_{ND}$ and $\Gamma_{ED}$ according to the following equations:

$\Gamma_{ND} = A \cos \alpha - B \sin \alpha$ $\Gamma_{ED} = A \sin \alpha + B \cos \alpha$ Other gravity gradiometer signals are not shown in the block diagram because they are not involved in the operation of the compassing function of the present invention. The azimuth rate command from the azimuth rate modulator 18 is applied to the integrator 20, which computes the azimuth angle $\alpha$ from the commanded rate $\dot{\alpha}$.

The signal $\Gamma_{ED}$ from resolver 17 is applied to the synchronous demodulator 21, which develops a demodulated signal proportional to $\Delta\Gamma_{ED}$. The demodulated signal is added to the commanded azimuth rate $\dot{\alpha}$ by summing means 22, and the resultant sum $\dot{\alpha}'$ is applied to the gryo torquer 13. This causes the platform 10 to rotate in azimuth, the rotational rate being $\dot{\alpha}'$. The platform's azimuthal rotation influences the gravity gradiometer 11 to modify the outputs A and B. Thus the apparatus depicted in FIG. 1 comprises a closed-loop control system, which can be made to drive the signal $\Delta\Gamma_{ED}$ to a null.

When $\Delta_{ED}$ vanishes, so does $\epsilon$, and that implies that the platform azimuth angle is actually equal to its supposed value $\Delta$, which is the output of the integrator 20. Since the output of the angle indicator 16 is the difference between platform azimuth and ship's heading, the sum of the output of integrator 20 with the output of angle indicator 16, as formed by the summing means 23, represents true ship's heading, H.

The preferred demodulator 21 to be used is an accumulator, analogous to a dual-slope integrator, that alternately adds and subtracts the current value of $\Gamma_{ED}$ in synchronism with the changes in azimuth rate. However, since the azimuth rate waveform is far from symmetrical, the value of $\Gamma_{ED}$ should be weighted in inverse proportion to the duration of the add and subtract phases of accumulation. Since the synchronous demodulator 21 is an integrator, its inclusion in the control loop corrects gryo drift, inter alia, without creating an azimuth bias. The gyro 12 with its torquer 13 is also an integrator; therefore, some damping means (not shown in FIG. 1) should be provided in order to prevent a low-frequency oscillation in aximuth. The description of such damping means is omitted here because it may readily be constructed by one skilled in the art of contrl systems.

The capability of the compass may be estimated from the equation for $\Delta\Gamma_{ED}$. With azimuth slew rate $\dot{\alpha}=15°$ per second, earth rate $=15°$ per hour and (e.g.) latitude $=60°$, the signal added to $\Gamma_{ED}$ is:
$$\Delta\Gamma_{ED} = \epsilon \times 9 \times 10^{-6} \sec^{-2} = \epsilon \times 9000 \text{ eötvös units.}$$
This signal is modulated by the azimuth rate command, which is a pulse train. Preferably, the pulse width is: 3, 4 or 8 seconds, and frequency is 1 pulse per minute. An azimuth error $\epsilon$ 1 milliradian will produce a pulse amplitude of 9 eötvös units, which should be readily discernible with 10 minutes of observation by the synchronous demodulator 21. If the control loop time constant is lengthened from 10 minutes to 100 minutes, an azimuth accuracy of 0.1 milliradian may be attainable.

It should be noted that much of the hardward associated with apparatus of the present invention may be replaced by a suitably programmed digital computer. The substitution of computer hardware and/or software for the apparatus of the present invention, however, would not materially affect the operation of the present invention.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. In a vehicular mounted gravity gradiometer system of the type having a gravity gradiometer which is disposed upon a gyroscopically stabilized platform and which is slewed through an angle $\alpha$ in response to a modified signal of an azimuth rate modulator means, a compass comprising:
   (a) means for resolving the output of said gradiometer into at least the gradient $\Gamma_{ED}$;
   (b) means for synchronously demodulating the gradient $\Gamma_{ED}$, to develop a signal proportional to $\Delta\Gamma_{ED}$;
   (c) means for summing $\Delta\Gamma_{ED}$ with the output of said azimuth rate modulator means to produce the modified slewing signal;
   (d) means for integrating the output of said azimuth rate modulator to determine $\alpha$;
   (e) means for indicating the angular rotation of said stabilized platform relative to the vehicle; and
   (f) means for summing the output of said integrating means with the output of said angular rotation indicating means to provide a vehicular heading.

2. An apparatus according to claim 1 wherein said means for demodulating the gradient $\Gamma_{ED}$ includes an accumulator that alternately adds and subtracts the current values of $\Gamma_{ED}$.

3. An apparatus according to claim 2 wherein said azimuth rate modulator means includes a pulse generator.

4. An apparatus according to claim 3 wherein said means for resolving the output of said gradiometer includes a resolver.

5. An apparatus according to claim 4 wherein said means for indicating angular rotation includes a synchro.

6. An apparatus according to claim 4 wherein said means for indicating angular rotation includes a shaft position encoder.

* * * * *